United States Patent
Herz

(10) Patent No.: US 8,523,267 B2
(45) Date of Patent: Sep. 3, 2013

(54) COLLAPSIBLE ROOF FOR A PASSENGER VEHICLE

(75) Inventor: Konrad Herz, Weissach (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 0 days.

(21) Appl. No.: 13/180,610

(22) Filed: Jul. 12, 2011

(65) Prior Publication Data

US 2012/0013142 A1   Jan. 19, 2012

(30) Foreign Application Priority Data

Jul. 13, 2010   (DE) .......................... 10 2010 027 007

(51) Int. Cl.
*B60R 13/02* (2006.01)

(52) U.S. Cl.
USPC ................. 296/107.06; 296/214; 296/187.05; 280/751

(58) Field of Classification Search
USPC ................... 296/214, 107.04–107.06, 107.09, 296/121, 187.05; 280/751
See application file for complete search history.

(56) References Cited

U.S. PATENT DOCUMENTS

| 3,050,334 | A | | 8/1962 | Geiger |
| 5,511,844 | A | * | 4/1996 | Boardman ............... 296/107.11 |
| 5,845,458 | A | * | 12/1998 | Patel ........................... 52/782.1 |
| 5,884,964 | A | | 3/1999 | Roeper et al. |
| 7,850,222 | B2 | | 12/2010 | Liedmeyer et al. |
| 7,959,209 | B2 | * | 6/2011 | Schumacher et al. ........ 296/121 |
| 2005/0156421 | A1 | * | 7/2005 | Nykiel et al. ................. 280/752 |
| 2008/0315621 | A1 | * | 12/2008 | Alvehav et al. ............ 296/146.7 |
| 2010/0096879 | A1 | | 4/2010 | Lewis et al. |

FOREIGN PATENT DOCUMENTS

| DE | 4001136 A1 | 7/1991 |
| DE | 4110575 C1 | 3/1992 |
| DE | 19707019 A1 | 10/1997 |
| DE | 20005180 U1 | 3/2001 |
| EP | 2228247 A2 | 9/2010 |

* cited by examiner

*Primary Examiner* — Dennis Pedder
(74) *Attorney, Agent, or Firm* — Brooks Kushman P.C.

(57) ABSTRACT

A collapsible roof for a vehicle includes a roof cap and an impact energy absorbing protective device connected to the roof cap. The roof cap has ribs. The ribs are spaced apart from one another in a longitudinal direction and each rib extends along a transverse direction. The ribs extend into the protective device.

8 Claims, 2 Drawing Sheets

COLLAPSIBLE ROOF FOR A PASSENGER VEHICLE

CROSS-REFERENCE TO RELATED APPLICATIONS

This application claims foreign priority benefits under 35 U.S.C.§119(a)-(d) to DE 10 2010 027 007.5, filed Jul. 13, 2010, which is hereby incorporated by reference in its entirety.

TECHNICAL FIELD

The present invention relates to a collapsible vehicle roof having a folding top structure with a roof cap.

BACKGROUND

DE 197 07 019 B4 (corresponding to U.S. Pat. No. 5,884,964) describes a hybrid headpiece for a convertible roof of a vehicle. The headpiece extends next to an upper cross beam of the windshield frame of the vehicle. The headpiece includes a tube section connected to the side rails of a top rail and aligned transversely to the longitudinal vehicle dimension. Upper and lower plastic pieces surround the tube section. The plastic pieces are assembled in a rearward region to flanges having an energy absorbing upholstery fabric. Another embodiment includes a comparable tube section embedded in a foam body having an energy absorbing section.

WO 2005/056347 A1 (corresponding to U.S. Pat. No. 7,850,222) describes a collapsible roof for a vehicle. A roof barb having recesses formed therein is with the windshield frame. The roof barb is a die cast structure and has a section extending into the passenger compartment of the vehicle. A cover including relatively thin-walled plastic or metal elements covers the recesses and can be deformed by vehicle passengers in the event of a head impact.

SUMMARY

An object of the present invention includes a roof cap for a collapsible roof of a passenger vehicle in which the roof cap has selective rigidity and is provided with a protective device that reduces potential injury risk to passengers in the passenger compartment of the vehicle under conditions of rapid or hazardous vehicle decelerations.

In carrying out the above object and other objects, the present invention provides a collapsible roof for a vehicle. The collapsible roof includes a roof cap and an impact energy absorbing protecting device. The roof cap has ribs. The ribs are spaced apart from one another in a longitudinal direction and each rib extends along a transverse direction. The protective device is connected to the roof cap. The ribs extend into the protective device.

Also, in carrying out the above object and other objects, the present invention provides a convertible vehicle. The vehicle includes a vehicle body having a passenger compartment and a windshield frame, a collapsible roof, and an impact energy absorbing protective device for passengers in the passenger compartment. The collapsible roof has a cover and a folding top structure with a roof cap. The folding top structure is connected to the cover and is configured to move with the cover between a closed position and an opened position. In the closed position the cover extends over the passenger compartment and the roof cap extends from the windshield frame opposite to the direction of forward vehicle travel. The roof cap includes ribs which extend into the protective device and are covered by the protective device. When the collapsible roof is in the closed position the ribs extend from the roof cap toward the passenger compartment and are spaced apart from one another in a longitudinal vehicle direction. Each rib extends along a transverse vehicle direction.

Embodiments of the present invention provide a roof cap of a folding top structure of a collapsible (convertible, foldable, etc.) roof of a passenger vehicle. The roof cap is made of a stiff material like a light metal casting, plastic, or the like. The roof cap includes local transverse extensions in the form of ribs for optimizing rigidity. The ribs are aligned in the direction of the passenger compartment of the vehicle when the collapsible roof is in a closed position extending over and covering the passenger compartment. The ribs lie in a relatively small distance from the heads of passengers in the passenger compartment when the collapsible roof is in the closed position. A protective device is associated with the roof cap. The protective device covers the ribs of the roof cap. The protective device is made of plastic having predefined energy absorbing properties. The protective device is intended to reduce the severity of injuries to the passengers as a consequence of a blow to the head caused by rapid vehicle deceleration. The protective device extends over a significant length of the roof cap, and does so both in the longitudinal and transverse vehicle directions. The protective device has recesses for the ribs on the side facing the inside of the roof cap. At least one of the recesses is designed to accommodate a cable, wiring harness, or the like. The attachment of the protective device in the front and rearward regions is characterized by simplicity and ease of assembly.

In an embodiment of the present invention, a collapsible roof for a passenger vehicle has a folding top structure with a roof cap. The roof cap lies next to an upper cross beam of a windshield frame of the vehicle body when the collapsible roof is in a closed position extending over and covering a passenger compartment of the vehicle. The roof cap extends with a flat wall section from the cross beam opposite to the direction of forward vehicle travel. The roof cap has an impact energy absorbing protective device for passengers in the passenger compartment. The roof cap on the side facing the passenger compartment has ribs. The ribs extend away from the inside of the roof cap toward the passenger compartment. The ribs are spaced in the longitudinal vehicle direction and proceed in the transverse vehicle direction. The protective device covers the ribs.

The above features, and other features and advantages of the present invention are readily apparent from the following detailed description thereof when taken in connection with the accompanying drawings.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
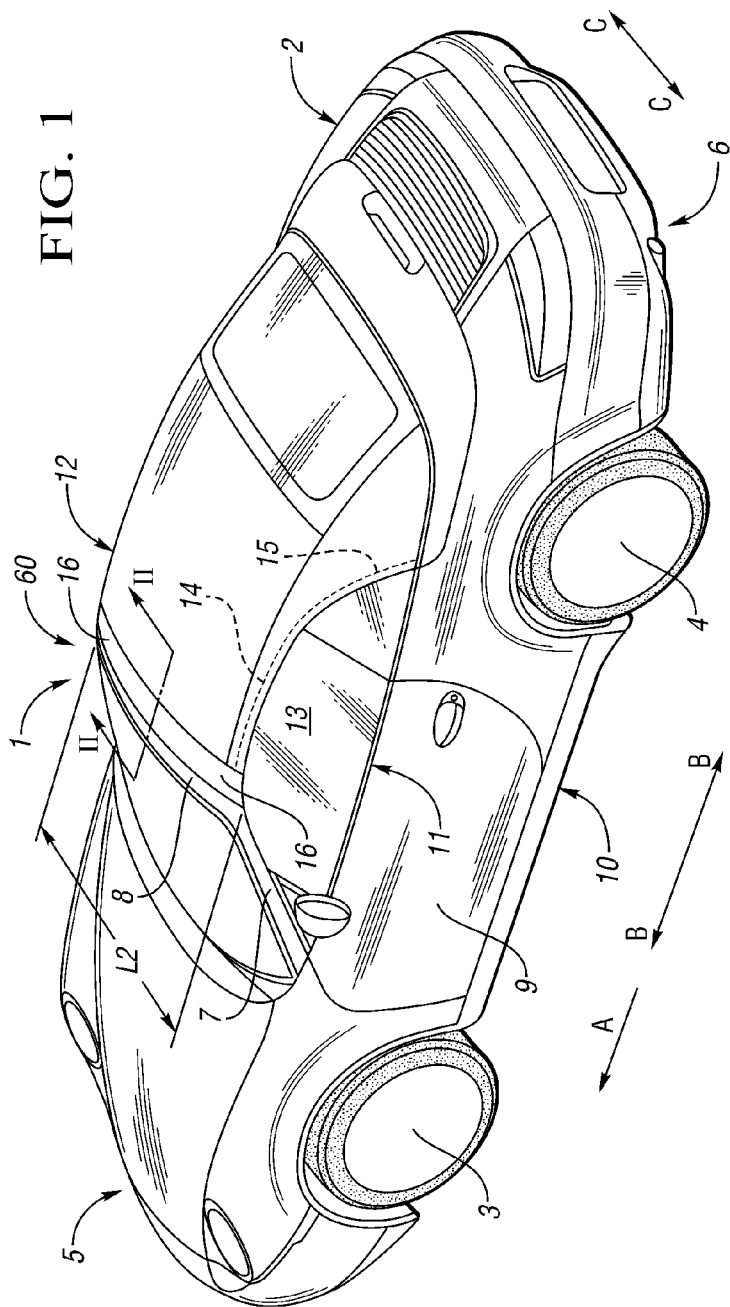
FIG. 1 illustrates a perspective view of a passenger vehicle having a collapsible roof in accordance with an embodiment of the present invention.

Referring now to FIG. 1, a perspective view of a passenger vehicle 1 having a collapsible roof 12 in accordance with an embodiment of the present invention is shown. Vehicle body 2 is supported by wheel sets 3 and 4. Vehicle body 2 has a front end 5 and a rear end 6 and vehicle doors 9. Front end 5 of vehicle body 2 includes a windshield frame 7. Windshield frame 7 has an upper cross beam 8. Base 10 of vehicle body 2 is bordered on the upper vehicle body side by a belt line 11. Belt line 11 extends approximately horizontally in the vehicle longitudinal direction B-B.

Collapsible roof 12 is movably connected to vehicle body 2 and is above belt line 11. Collapsible roof 12 is movable between a closed position (shown in FIG. 1) and an opened position. In the closed position, collapsible roof 12 arches over and covers a passenger compartment 13 of vehicle 1. In the opened position, collapsible roof 12 is rearwardly lowered into a rear storage compartment (e.g., trunk) of vehicle 1.

Collapsible roof 12 is designed as a folding top structure 60. Collapsible roof 12 includes a cloth cover 14 and a top rail 15. Top rail 15 has a roof cap 16. Roof cap 16 is formed of a stiff material like a light metal casting, highly rigid plastic, or the like. Roof cap 16 is adjacent to upper cross beam 8 of windshield frame 7 when collapsible roof 12 is in the closed position. A wall section 17 of roof cap 16 supports cloth cover 14. Wall section 17 extends flat opposite to the direction of forward vehicle travel A. A barbed zone 18 of wall section 17 connects to upper cross beam 8 when collapsible roof 12 is in the closed position.

Figure 2:
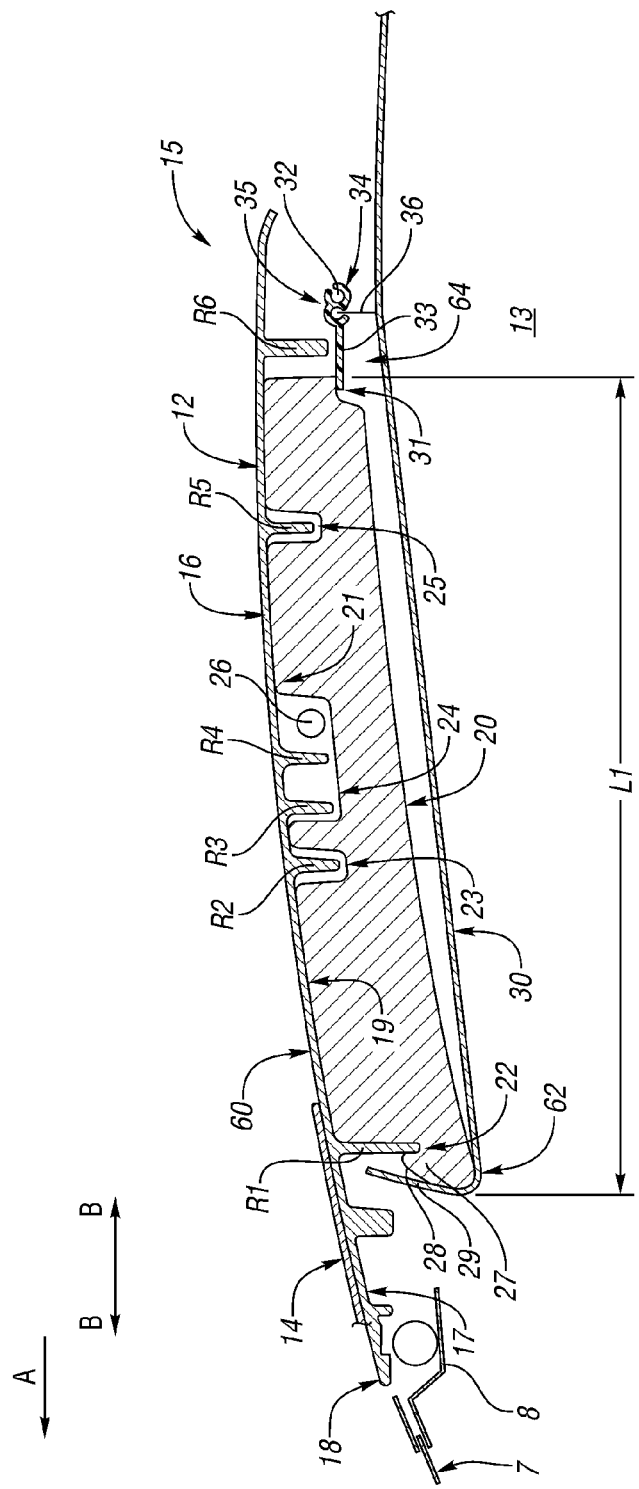
FIG. 2 illustrates an enlarged cross-sectional view of the section along line II-II of FIG. 1.

Referring now to FIG. 2, with continual reference to FIG. 1, an enlarged cross-sectional view of the section along line II-II of FIG. 1 is shown. As shown in FIG. 2, roof cap 16 is fitted with upright ribs R1, R2, R3, R4, R5, and R6 for increased rigidity. The ribs extend from interior surface 19 of wall section 17 in the direction towards passenger compartment 13.

A protective device 20 covers ribs R1, R2, R3, R4, R5, and R6. Protective device 20 extends essentially over the lengths L1 and L2 of roof cap 16, i.e., in the longitudinal vehicle direction B-B and in the transverse vehicle direction C-C. Protective device 20 is intended to reduce the risk of injury to occupants of passenger compartment 13 during excessive deceleration of vehicle 1. In an embodiment, protective device 20 is formed as a flat piece from a single piece of plastic foam material with predefined impact energy absorbing properties. In an embodiment, protective device 20 is manufactured from polyurethane with a density of approximately 100 g/l.

Protective device 20 includes recesses 22, 23, 24, and 25 configured to receive at least some of the ribs. In particular, recess 22 receives rib R1, recess 23 receives rib R2, recess 24 receives ribs R3 and R4, and recess 25 receives rib R5. Recesses 22, 23, 24, and 25 are on the interior side 21 of protective device 20 facing interior surface 19 of wall section 17 of roof cap 16. Interior side 21 of protective device 20 supports interior surface 19 of wall section 17.

Recess 24 for ribs R3 and R4 also accommodates a cable 26, wiring harness, or the like. Recess 22 for rib R1 lies in a forward region 62 of protective device 20 as seen in the direction of forward vehicle travel direction A. Recess 22 surrounds rib R1 at least section-wise in a form fitting manner as shown in FIG. 2. As such, protective device 20 is fastened to rib R1 by recess 22.

Protective device 20 has a convex extension 27. Convex extension 27 is aligned in the direction of forward vehicle travel A. Convex extension 27 has a rounded contour 28 near recess 22. An interior lining 30 is wrapped around a bend 29 about contour 28 of convex extension 27. A retaining bar 31 is installed on a rearward region 64 of protective device 20. Retaining bar 31 is held in position by a cord 32. Retaining bar 31 covers rib R6 with a horizontal attachment section 33. Retaining bar 31 has a first holding fixture 34 for cord 32 and a second holding fixture 35 for a support element 36 of interior lining 30.

While exemplary embodiments are described above, it is not intended that these embodiments describe all possible forms of the present invention. Rather, the words used in the specification are words of description rather than limitation, and it is understood that various changes may be made without departing from the spirit and scope of the present invention.

Additionally, the features of various implementing embodiments may be combined to form further embodiments of the present invention.

What is claimed is:

1. A collapsible roof for a vehicle, comprising:
a roof cap having a plurality of ribs, wherein the ribs are spaced apart from one another in a longitudinal direction and each rib extends along a transverse direction;
an impact energy absorbing protective device connected to the roof cap;
a cover;
a folding top structure connected to the cover and configured to move with the cover between a closed position and an opened position, wherein the roof cap is part of the folding top structure; and
an interior lining for a passenger compartment of a vehicle;
wherein the ribs extend into the protective device;
wherein the protective device has a plurality of recesses for receiving the ribs, wherein the protective device surrounds one of the ribs in a form fitting manner with a recess in a front region of the protective device, wherein the protective device has a convex extension adjacent to the recess in the front region of the protective device, wherein the convex extension is delimited by a rounded contour;
wherein the interior lining is wrapped about the contour of the convex extension of the protective device;
wherein the protective device includes a retaining bar located in the rear region of the protective device and held in place by a cord.

2. The collapsible roof of claim 1 wherein:
the retaining bar has an attachment section with a first holding fixture for the cord and a second holding fixture for a support element of the interior lining on the attachment section.

3. A convertible vehicle comprising:
a vehicle body having a passenger compartment and a windshield frame;
a collapsible roof having a cover and a folding top structure with a roof cap, wherein the folding top structure is connected to the cover and is configured to move with the cover relative to the vehicle body between a closed position and an opened position, wherein in the closed position the cover extends over the passenger compartment and the roof cap extends from the windshield frame opposite to the direction of forward vehicle travel; and
an impact energy absorbing protective device for passengers in the passenger compartment;
wherein the roof cap includes a plurality of ribs which extend into the protective device and are covered by the protective device, wherein when the collapsible roof is in the closed position the ribs extend from the roof cap toward the passenger compartment and are spaced apart from one another in a longitudinal vehicle direction, wherein each rib extends along a transverse vehicle direction;

wherein the protective device has a plurality of recesses for receiving the ribs, wherein the recesses are on a side of the protective device facing the roof cap, wherein the protective device surrounds one of the ribs in a form fitting manner with a recess in a front region of the protective device observed in the direction of forward vehicle travel;

wherein the protective device has a convex extension adjacent to the recess in the front region of the protective device, wherein the convex extension is delimited by a rounded contour:

the collapsible roof further having an interior lining for the passenger compartment, wherein the interior lining is wrapped about the contour of the convex extension of the protective device;

wherein the protective device includes a retaining bar located in the rear region of the protective device and held in place by a cord.

4. The vehicle of claim 3 wherein:
the protective device extends over lengths of the roof cap in the longitudinal vehicle direction and the transverse vehicle direction.

5. The vehicle of claim 3 wherein:
at least one of the recesses is configured to further receive a cable.

6. The vehicle of claim 3 wherein:
the retaining bar has an attachment section with a holding fixture for the cord.

7. The vehicle of claim 3 wherein:
the retaining bar has an attachment section with a holding fixture for a support element of the interior lining on the attachment section.

8. The vehicle of claim 3 wherein:
the protective device includes a plastic with predefined impact energy absorbing properties and is made from one or a plurality of pieces.

* * * * *